United States Patent [19]
Ashley et al.

[11] Patent Number: 5,823,381
[45] Date of Patent: Oct. 20, 1998

[54] LOAF SEALING BREAD BOX

[75] Inventors: Todd H. Ashley; Charles R. Wood, both of North Little Rock, Ark.

[73] Assignee: Bread Shed Inc., North Little Rock, Ark.

[21] Appl. No.: 782,907

[22] Filed: Jan. 11, 1997

[51] Int. Cl.[6] .................................................. B65D 25/10
[52] U.S. Cl. ........................ 220/559; 220/578; 220/544; 206/817
[58] Field of Search .................................. 220/578, 531, 220/532, 534, 543, 544, 559, 558, 331; 206/555, 817, 425

[56] References Cited

U.S. PATENT DOCUMENTS

| | | | |
|---|---|---|---|
| 2,239,484 | 4/1941 | Cocks | 220/532 |
| 2,246,967 | 6/1941 | Zalkind | 220/543 |
| 2,840,083 | 6/1958 | Myers | 220/559 |
| 3,491,986 | 1/1970 | Plett | 220/532 |
| 4,034,890 | 7/1977 | Baller | 220/334 |
| 4,266,668 | 5/1981 | Paek | 206/557 |
| 4,508,027 | 4/1985 | McCord | 220/543 |
| 4,585,142 | 4/1986 | Chulich | 220/331 |
| 4,905,869 | 3/1990 | Grigsby et al. | 221/92 |
| 5,494,187 | 2/1996 | Schuelein et al. | 220/558 |

FOREIGN PATENT DOCUMENTS

A 079212  10/1962  France .................................. 220/543

Primary Examiner—Stephen J. Castellano
Attorney, Agent, or Firm—Stephen D. Carver

[57] ABSTRACT

Bread boxes that automatically seal the loaf wrapper after slices of bread are consumed. In both embodiments a rigid bottom, base that is adapted to be disposed upon a supporting surface has a pair of parallel, vertical sides that terminate at a back piece. The sides are spaced to fit a loaf of bread between them. A self closing door system closes the front of the box. With a loaf of bread disposed between the sides upon the base, the front door presses against the exposed wrapper end to seal the loaf. In a first embodiment the door is pivotally suspended between follower slots defined in the sides. Suitable followers on opposite sides of the door align it as it slides in and out. These followers are entrained within the elongated slots so jamming is prevented. In a second embodiment, a resilient, slidable handle traverses the box top and suspends and pivots the door. Sides of the box are fitted to a guide channel defined in the handle ends between a ledge and a hook that captivate the sides within the channels. The handle may be snap fitted to the device in assembly. As bread slices are withdrawn from either device, each door easily slides inwardly so that it will always close the bread wrapper as close as possible to the last remaining slice of bread to minimize volume and enhance freshness.

7 Claims, 5 Drawing Sheets

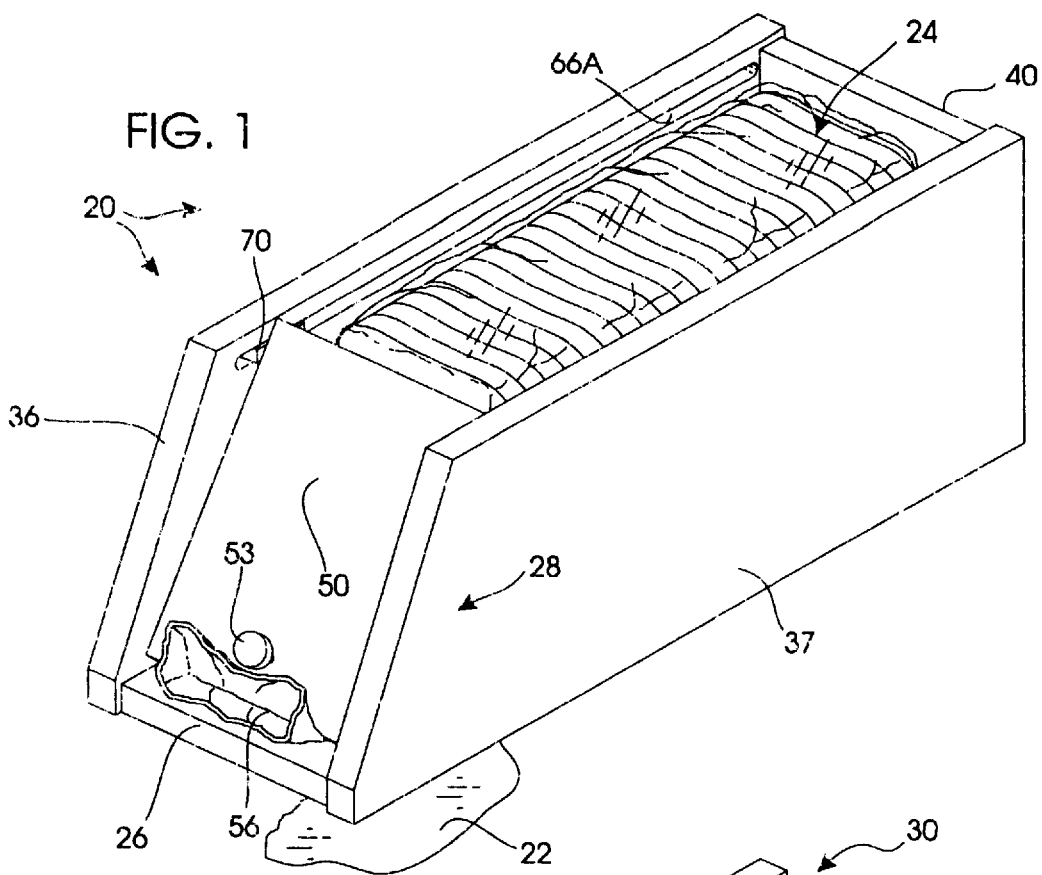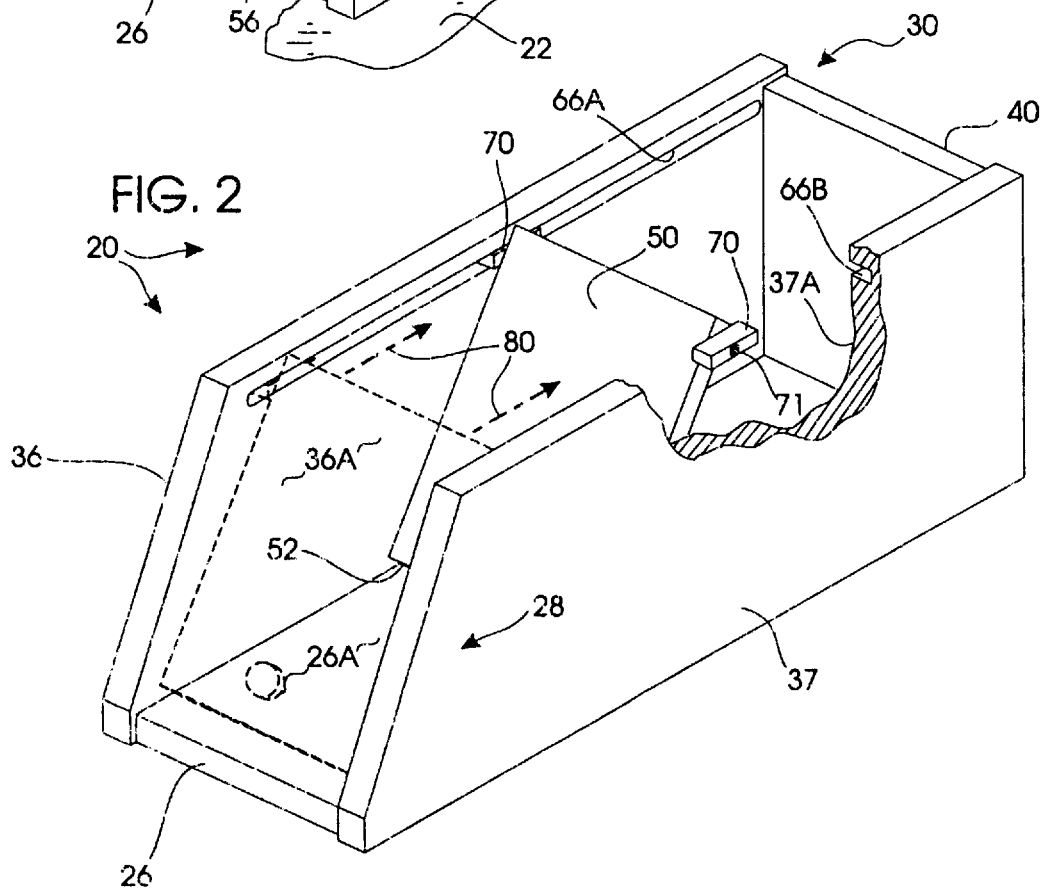

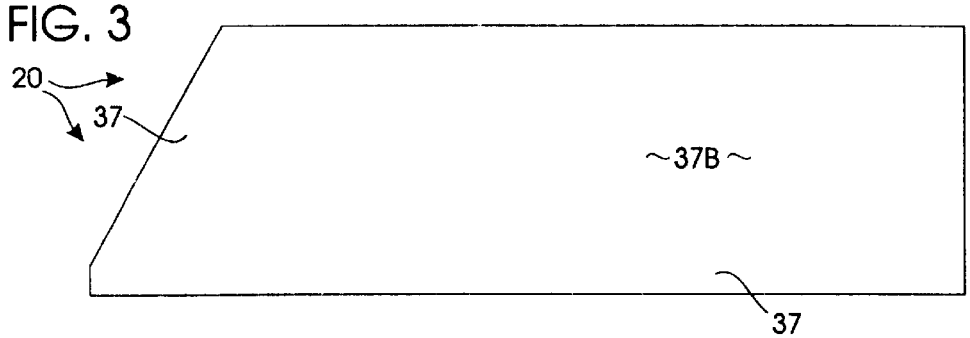
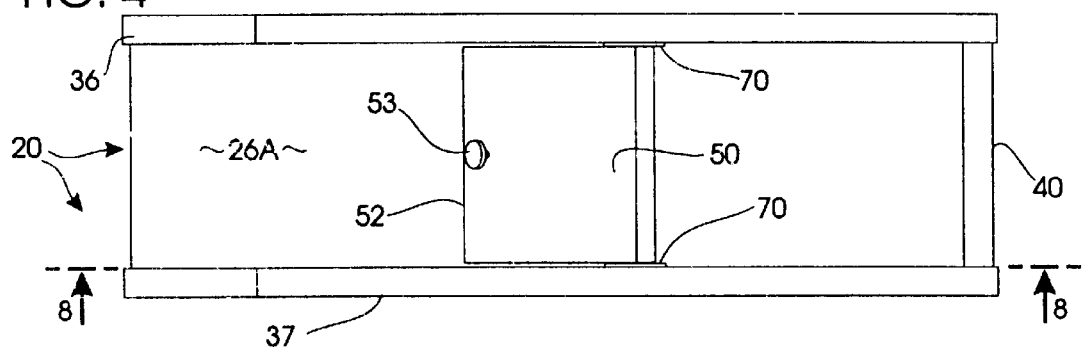
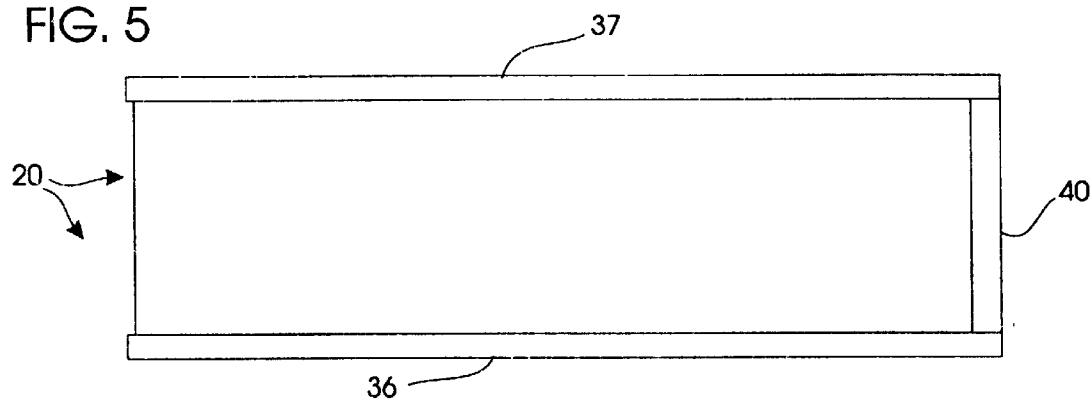
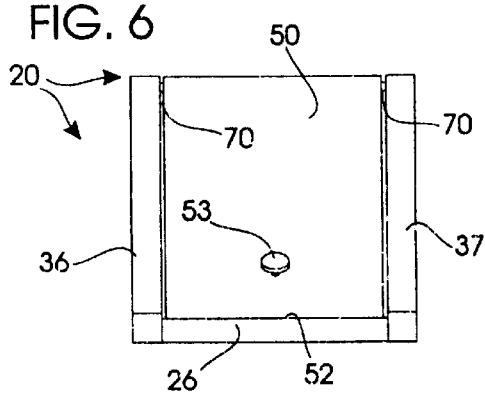
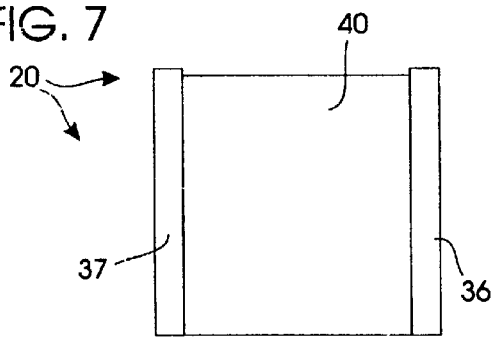

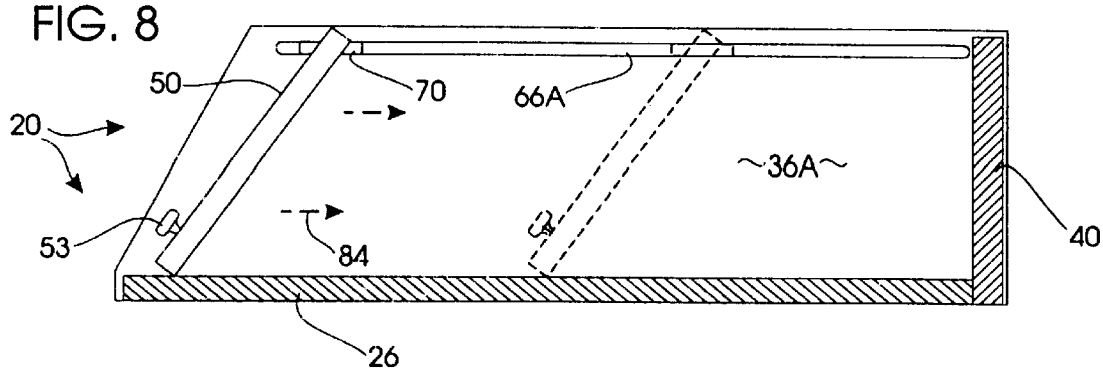
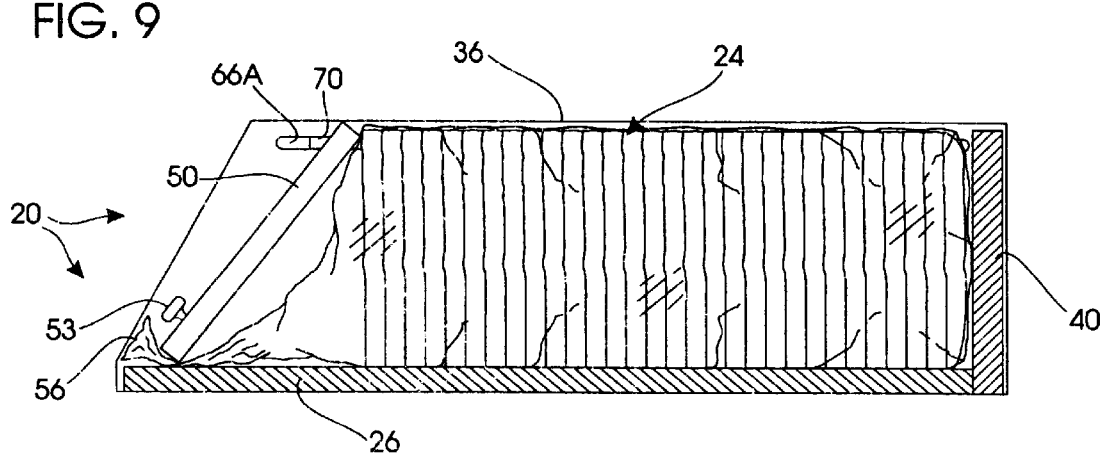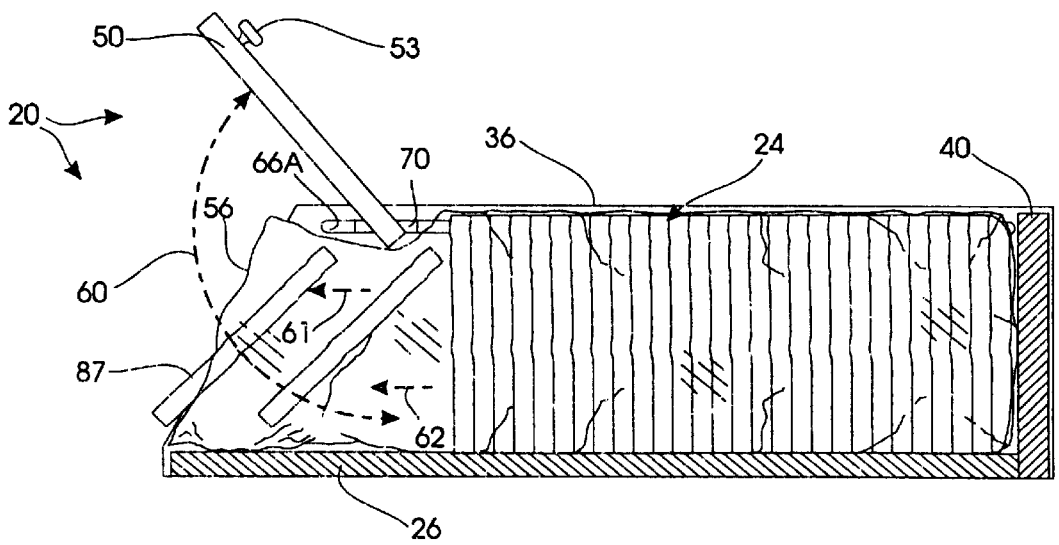

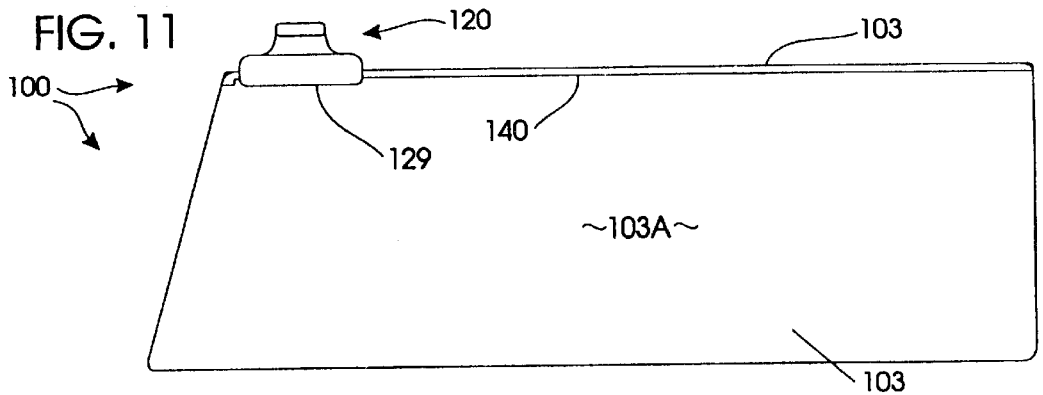
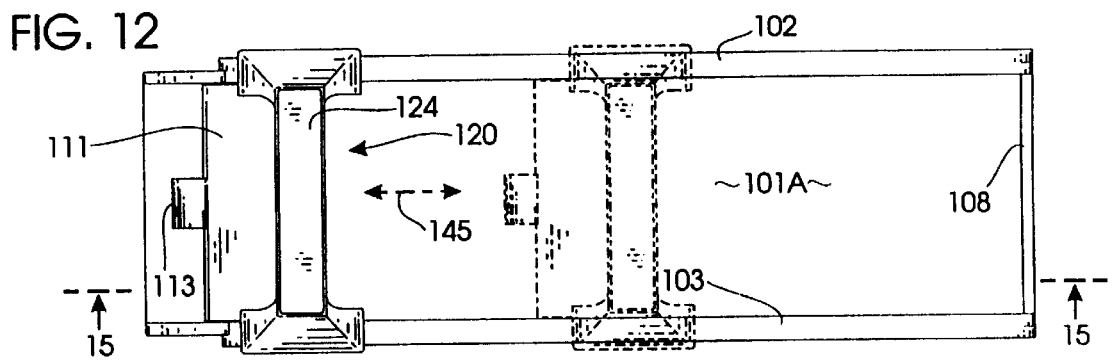
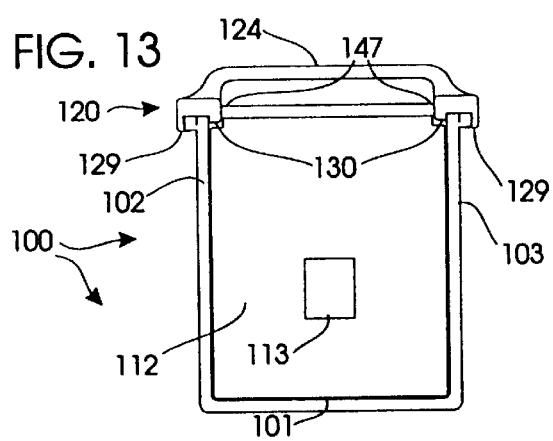
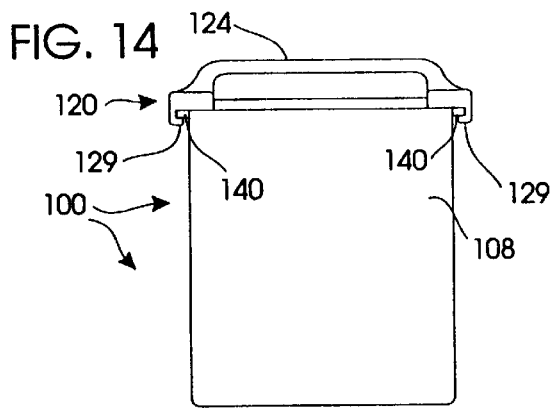
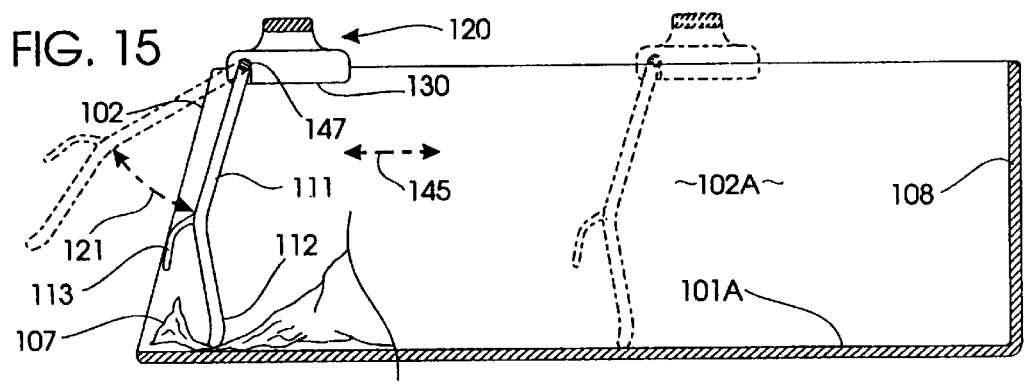

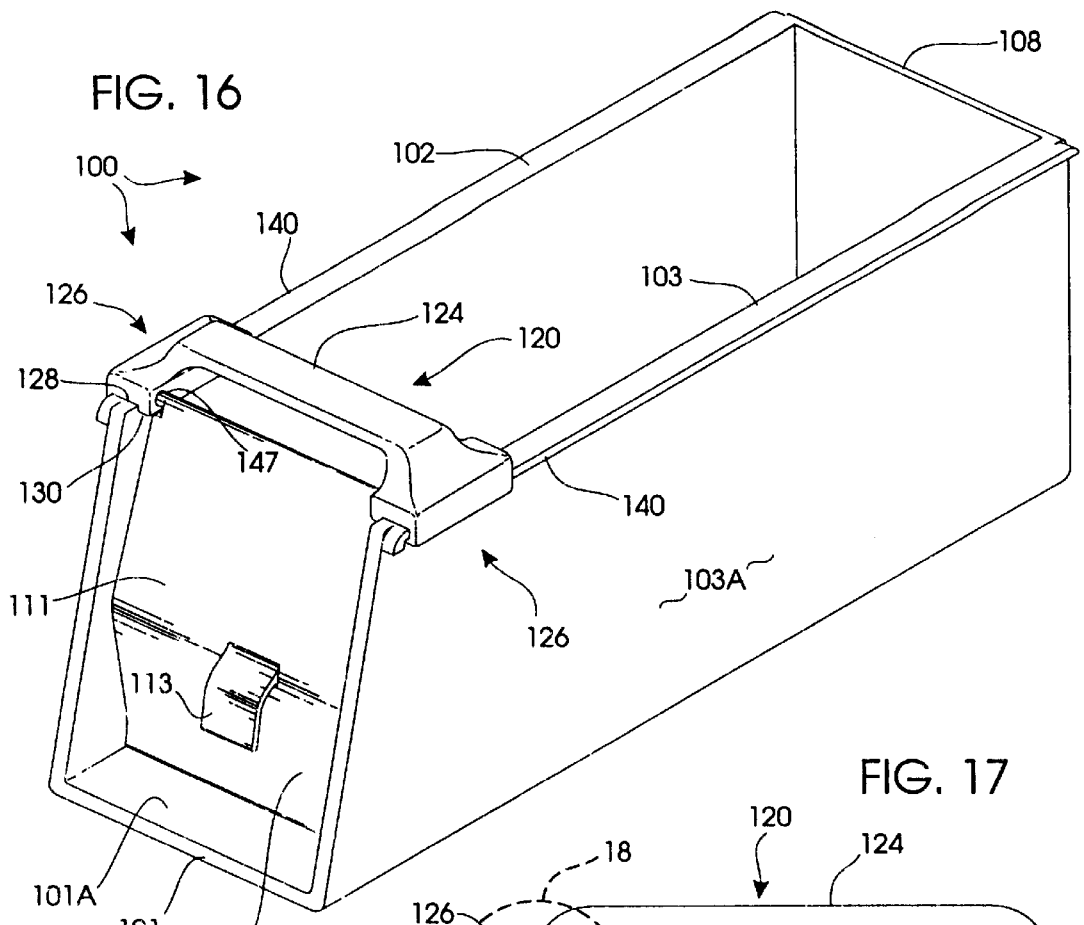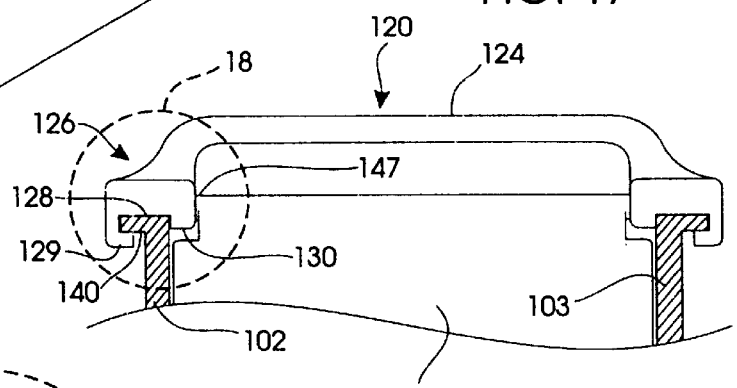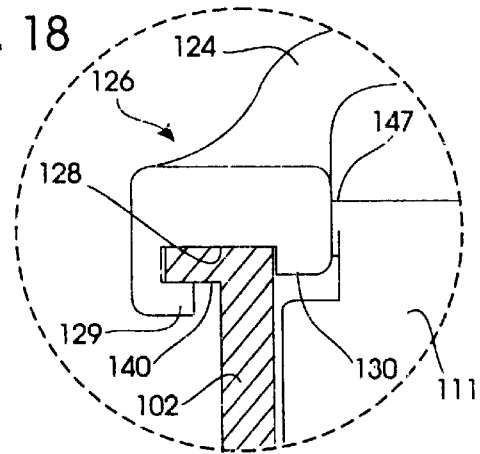

LOAF SEALING BREAD BOX

BACKGROUND OF THE INVENTION

1. Field of the Invention

The present invention relates generally to enclosures for storing bread and other food articles. More particularly, the present invention relates to a bread box that is automatically self-sealing to preserve the freshness of a wrapped loaf of bread disposed within the box.

2. Description of the Prior Art

In the prior art it is known to provide various forms of enclosures of wood, metal or the like, for storing bread. Obviously, the broad idea of an enclosure for storing loaves of bread is an ancient concept and there is much prior art on the subject. Many devices present a form of fixed enclosure or cabinet that has a door for access. Relatively few prior art bread box devices combine an easy access enclosure or cabinet structure with a door that automatically seals the wrapper whenever bread is withdrawn.

Prior U.S. Pat. No. 4,034,890 shows a bread box in which a movable door can theoretically engage the exposed end of the bread loaf wrapper to seal it. However, this device tends to make the bread difficult to withdraw. The ramped internal structure presents an obstacle to ease of access. The latter structure also is difficult to use as it has a closed top. Further, the door is relatively fixed and does not "track" the loaf as it becomes smaller when slices are withdrawn.

Prior U.S. Pat. No. 4,905,869 discloses structure comprising guide slots defined on interior sides of the cabinet. The slots allow tracking of a slice discharge mechanism.

U.S. Pat. No. 4,266,688 discloses a bread box which has a front with a slot in which the exposed bread wrapper end may be wedged for closing. U.S. Pat. No. 5,494,187 discloses a bread box in which a conventional, foldable door can be opened to expose the bread therewithin.

However, there is a need for an easily operated, structurally sound bread box which reliably dispenses the bread, but at the same time seals the bread wrapper after the discharge process. In other words, there is a need for a bread box which allows bread slices to be withdrawn, even by children, with minimum effort. A desirable system must automatically seal the wrapper afterwards without laborious effort. No known prior art combines an easily opened door that tracks the loaf as slices are withdrawn, but which thereafter automatically seals the wrapper to prevent the bread from becoming stale. Moreover, there is a need for a reliable bread box of the character described that automatically adjusts in position depending upon the number of slices of bread that have been withdrawn from the loaf

SUMMARY OF INVENTION

The present invention comprises a dynamically constructed bread box which automatically seals the loaf after individual slices are discharged, and which can be easily accessed to quickly remove individual bread slices. Two embodiments of such an ideal bread box are described herein.

In both cases a rigid base substantially forms the bottom of the device. The base can be disposed upon a supporting surface such as a counter, shelf or the like. Alternatively, either bread box may be stored in a refrigerator. At each side of the base there are a pair of upstanding, generally parallel sides that are spaced apart appropriately to fit a loaf of bread between them. Both the sides and the base are substantially elongated and rectangular. The rear of the bread box is closed with a back plate that extends between the rear sides and secures them at the base.

A slidable, pivoting door system closes the front of the apparatus. With a loaf of bread disposed between the sides upon the base, the front door pivotally rests upon the exposed wrapper of the loaf. In so doing, it seals the wrapper so that the bread remains fresh. However, the door can be easily be lifted with a simple knob so that it will expose slices of bread for removal as desired. Further, the door contacts the wrapper in a region that is immediately accessible when bread slices are to be withdrawn. In both designs the access door is pivotally suspended dynamically between the sides.

The first embodiment is preferably made of wood. The generally rectangular door is equipped with a pair of elongated followers on opposite sides of its top. Each follower is linked to the door, enabling pivoting. Opposite, interior sides at the top of the bread box are provided with elongated follower slots. The door followers are slidably disposed within the slots so that the door may be moved longitudinally with respect to the box. At the same time, since the followers are entrained within the elongated slots, jamming is prevented as proper alignment of the door is preserved. The door continues to pivot as desired as it slides to new positions within the box.

As bread slices are withdrawn, the door easily slides inwardly so that it will always close the bread wrapper as close as possible to the last remaining slice of bread to preserve freshness. Whenever the door is closed or allowed to drop, it forcibly wedges the exposed bread wrapper end against the base to seal the wrapper and prevent the bread from becoming stale.

In an alternative, preferably plastic embodiment, the tops of the sides are equipped with special projections. A slidable cover is resiliently snapped between the sides. The movable cover mounts the door at the top of the box for slidable movement with respect thereto. The cover is aligned by the projections as it slidably moves along the top of the box. Alignment is enhanced by the coupling structure. The door pivots from the top cover can be moved with the cover inwardly or outwardly, traveling longitudinally within the bread box. Thus the door "follows" the loaf as it decreases in size when slices are withdrawn. In this manner the door will always be positioned proximate the last remaining slice of bread, so that when it closes it will automatically seal the wrapper as close as possible to the last slice. By minimizing the volume of the wrapper each time bread is consumed, freshness is enhanced.

Thus, an object of the present invention is to provide a bread box which maximizes freshness.

Another primary object of the present invention is to provide a bread box of the character described that automatically closes the bread loaf wrapper to maintain freshness.

Another important object is to provide a self-sealing bread box of the character described which is easy to use, by children and the like, and which will nevertheless maintain the freshness of the bread.

A still further object is to provide a bread box wherein the door maintains freshness by automatically closing the bread wrapper as close as possible to the last remaining bread slice.

Yet another object is to provide suitable bread boxes that may be conveniently placed upon a shelf or a counter top.

A related object is to provide alternative bread box designs that that may be conveniently placed within a refrigerator.

A similar object is to provide a bread box equipped with a dynamic door of the character described that can be variably positioned within the cabinet, while preserving alignment to insure proper pivoting.

Still another object of the present invention is to provide a resilient, plastic version bread box in which a resilient cover pivotally mounts the door and is resiliently snap-fitted upon the sides.

Another basic object is to eliminate the need for twist ties, tabs or other unreliable devices used in the past to seal bread wrapper ends.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary, front isometric view of a first embodiment of our loaf-sealing bread box;

FIG. 2 is a partially-fragmented, isometric view similar to FIG. 1, showing the door in a moved position, and revealing the interior tracking system.

FIG. 3 is a side elevational view of the box seen in FIGS. 1 and 2;

FIG. 4 is a top plan view of the box seen in FIGS. 1 and 2, taken generally from the top of FIG. 2;

FIG. 5 is a bottom plan view of the box seen in FIGS. 1–4;

FIG. 6 is a front elevational view of the box seen in FIGS. 1–5 taken generally from a position to the left of FIG. 2;

FIG. 7 is a rear elevational view of the box seen in FIGS. 1–6;

FIG. 8 is a longitudinal sectional view of the bread box of FIGS. 1–7, which shows moved positions with dashed lines;

FIG. 9 is a longitudinal sectional view taken generally through FIG. 1;

FIG. 10 is a sectional view showing the removable bread slices and the door in an open position;

FIG. 11 is a side elevational view of a alternative embodiment of the bread box;

FIG. 12 is a top plan view of the alternative bread box of FIG. 11;

FIG. 13 is a front plan view of the alternative bread box;

FIG. 14 is a rear plan view of the alternative bread box;

FIG. 15 is a longitudinal sectional view of the alternative bread box;

FIG. 16 is a enlarged, isometric view of the alternative bread box;

FIG. 17 is an enlarged, fragmentary sectional view of the top region of the alternative bread box; and, FIG. 18 is an enlarged, fragmentary view showing circled region 18 of FIG. 17.

DETAILED DESCRIPTION

With initial reference now directed to FIGS. 1–10 of the drawings, a loaf sealing bread box constructed in accordance with the teachings of this invention has been generally designated by the reference numeral 20. Bread box 20 is preferably made of wood. It is disposed upon a suitable support or surface 22 for storing a conventional loaf of bread 24 for consumption. The box maintains the freshness of the bread by automatically sealing the wrapper after slices are withdrawn.

Bread box 20 preferably comprises a generally rectangular, rigid base 26 having an exposed upper, interior surface 26A (FIG. 2) that supports the bread loaf 24 (FIG. 1). Base 26 extends from the front 28 of the bread box to the rear 30. Generally rectangular, wooden sides 36, 37 extend vertically and upwardly from opposite edges of the base 26. Sides 36, 37 are parallel with one another and are coextensive with the length of the bread box and base 26. A back 40 closes the rear of the bread box and extends between the rear ends of the sides 36, 37. The enclosure is completed by an angled and pivoted door 50 that may be opened to expose individual slices of bread for withdrawal from the wrapped loaf 24. In FIG. 10 the wrapper end 56 is opened, and slices 87 of bread may be withdrawn as indicated by arrows 61, 62.

Door 50 is generally rectangular. It is normally disposed at an angle. It has a bottom 52 which, when the door is closed, rests against the surface 26A of base 26. In particular, when the door 50 is closed or released, it drops against the exposed end portion 56 of the bread loaf wrapper. The exposed wrapper end is pressed against base surface 26A by the door to maintain a seal. Door 50 may be conveniently grasped at any time with a conventional knob 53 affixed to its front surface.

With reference to FIG. 10 the door may be pivoted between open and closed positions, traversing the arc generally represented by dashed line 60. At the same time, as hereinafter explained, the door may slide longitudinally along the length of the bread box as indicated generally by arrows 80 in FIG. 2.

As best viewed in FIGS. 2–8, each side 36, 37 has an upper elongated follower slot defined therein. For example, the inner surface 36A projecting towards the interior of the bread box, has an elongated follower slot 66A defined therein. This slot 66A is generally spaced apart from and parallel with a companion follower slot 66B formed in side 37. Noting FIG. 2, slot 66B is formed in the inner surface 37A of side 37. These follower or guide slots dynamically align the pivoted door 50.

As best seen in FIG. 2, the top of the door 50 is pivoted to a block-like generally rectilinear follower 70 at both sides. Each follower 70 is fastened with a suitable fastener 71 which allows pivotal movement between the door 50 and the follower 70. Followers 70 are captivated within and between guide slots 66A, 66B. The followers track within and between the aligned slots to enable movement of the door as generally indicated by arrows 80 (FIG. 2). Thus, the moved position seen in FIG. 8 may be attained, as door 50 slides in the direction of arrows 84 (FIG. 8). Of course, as previously explained, the door 50 may pivoted inwardly, upwardly or downwardly to open or close the bread box as in FIG. 10.

Thus, the bread box 20 may be conveniently opened simply by grasping knob 53 and lifting the door upwardly. When this occurs, the bread wrapper end 56 is unobstructed, and one or more bread slices 87 (FIG. 10) can be removed. As bread is consumed, the door will naturally slide into position towards the last remaining piece of bread. Thus, it will slide inwardly of the bread box as indicated by arrows 80 in FIG. 2. At the same, it can continue to be moved upwardly and downwardly as arrow 60 indicates in FIG. 10. When it is closed it will drop against the bread wrapper end 56 to seal the bread wrapper and keep the bread fresh, no matter how careless or forgetful the consumer may be.

Turning now to FIGS. 11–18, an alternative embodiment of our bread box has generally been designated by the reference numeral 100. Bread box 100 may be fabricated through plastic molding or the like. It includes a channel-like base comprising a bottom 101 and a pair of integral, spaced apart, parallel sides 102, 103 which are coextensive with the length of the box. The outer surface of side 103 has been designated by the reference numeral 103A (FIG. 11). The inner surface of bread box base 101 has been designated by the reference numeral 101A. A bread loaf within the box 100 rests upon this surface 101A. The rear is closed as indicated in FIG. 11 by the rear back piece 108.

The access door 111 is pivotally coupled at the front of the bread box. Door 111 is somewhat curved. It includes a lowermost portion 112 which contacts base surface 101A to seal the bread loaf by contacting and pressing against the open wrapper end 107. It is generally arcuately profiled, and it includes an integral, stylistic handle 113 which may be grasped by the user.

Door 111 is suspended above the box by a resilient, handle assembly generally designated by the reference numeral 120. Details of the handle assembly are best viewed in FIGS. 17 and 18. The handle 120 comprises a cross piece 124 which surmounts the top of the bread box and terminates at integral coupling ends 126. These ends 126 include an internal guide channel 128 coextensive with their length. Elongated channel 128 is integrally defined between a lower generally "L" shaped hook portion 129 and an opposite, lower ledge 130. The top of each side is specially configured to fit within channel 128. Thus, the follower (FIGS. 17, 18) 140 is conformed generally in the form of a rectangle so that it tends to be wedged into and captivated by guide channel 128 between ledge 130 and hook 129. Handle 124 may nevertheless be moved along the longitudinal length of the apparatus as indicated by arrow 145 (FIG. 12).

The sliding handle structure pivotally mounts the door. The ledge portion 130 is penetrated by a pivoting fastener 147 that extends into the top end of the door 111. This construction is used at both sides, so that aligned fasteners 147 pivot door 111 to the handle assembly 124. Therefore, the lower end 112 of the door 111 can always reach the bread wrapper end 107 (FIG. 15). Further it can pivot between positions at the extremes of arrow 121 (FIG. 15). When closed, as illustrated by solid lines if FIG. 15, it wedges against the inner surface 101A the base 101 to firmly, yieldably seal the wrapper. Concurrently, the handle may be moved inwardly or outwardly along the length of the bread box so that the door 111 may always be disposed adjacent the last remaining slice in the bread wrapper, as is the case in embodiment 20.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A bread box for storing a loaf of bread, said box comprising:
   a base adapted to be disposed upon a supporting surface, said base comprising a pair of edges and a front and rear;
   a pair of upstanding, parallel sides disposed on opposite edges of said base each side comprising a top configured with a follower;
   a handle slidably disposed at the top of the box, the handle comprising opposite ends having channel means for receiving and captivating the followers on said sides;
   a front door pivotally coupled to said handle between said sides, said door pivotal between a closed position contacting said base and an open position;
   whereby when a wrapped loaf of bread is stored in said bread box at least a portion of the loaf wrapper is pressed between the base and the door when the door is in said closed position, and, when the door assumes said open position, the bread loaf is partially exposed for withdrawing at least one slice of bread.

2. The bread storage box as defined in claim 1 wherein channel means is defined between a ledge and a hook that captivate said last mentioned follower.

3. A bread box for storing a wrapped loaf of bread, said box being generally in the form of a parallelepiped and comprising:
   a flat, rectangular base adapted to be disposed upon a supporting surface, said base comprising a pair of edges, a front, and a rear;
   a pair of upstanding, spaced apart, parallel sides disposed on opposite edges of said base;
   a back extending between said sides at said base rear;
   a front door extending substantially between said sides at an inclined angle with respect to said base, said front door slidably movable with respect to the base so it may be moved inwardly of said box as bread is consumed;
   handle means for pivoting and sliding said door;
   guide means for preventing misalignment or binding of said door;
   follower means engaged with said guide means for controlling slidable displacement of said door;
   wherein said follower means is defined on said sides at their tops, said handle means secures said guide means and said guide means receives and captivates said follower means;
   whereby when a wrapped loaf of bread is stored in said bread box at least a portion of the loaf wrapper is pressed between the base and the door when the door is in a closed position, and, when the door assumes an open position, the bread loaf is partially exposed for withdrawing at least one slice of bread.

4. The bread storage box as defined in claim 3 wherein said door is pivotally suspended from said handle means and slides along the box therewith.

5. The bread storage box as defined in claim 4 wherein said guide means is defined between a ledge and a hook that captivate said follower means.

6. A generally rectilinear, plastic bread box for storing a wrapped loaf of bread, said box comprising:
   a base adapted to be disposed upon a supporting surface, said base comprising a pair of edges and a front and rear;
   a pair of upstanding, integral parallel sides disposed on opposite edges of said base said sides each comprising a top configured with a follower;

an integral back extending between said sides;

a handle extending across the top of the box and slidably coupled to said sides said handle comprising guide channels at its opposite ends that receive and captivate said last mentioned follower(s);

a front door pivotally coupled to and suspended by said handle, said door slidable with said handle; and, whereby when a wrapped loaf of bread is stored in said bread box at least a portion of the loaf wrapper is pressed between the base and the door when the door is in a closed position, and, when the door assumes an open position, the bread loaf is partially exposed for withdrawing at least one slice of bread.

7. The bread box as defined in claim 6 wherein said guide channel is defined between a ledge and a hook that captivate said last mentioned follower.

* * * * *